United States Patent [19]
Adamson

[11] Patent Number: 5,362,077
[45] Date of Patent: Nov. 8, 1994

[54] SHOPPING CART HAVING RETRACTABLE CUPHOLDER

[75] Inventor: Mark Adamson, Broken Arrow, Okla.

[73] Assignee: UNR Industries, Inc., Chicago, Ill.

[21] Appl. No.: 170,517

[22] Filed: Dec. 20, 1993

[51] Int. Cl.⁵ ............................................. B62B 5/00
[52] U.S. Cl. .................................. 280/33.992; 211/74;
211/94.5; 224/277; 224/281; 224/42.44
[58] Field of Search ................. 280/33.992, 33.991,
280/35, DIG. 3, DIG. 4; 211/74, 75, 79, 85, 94,
94.5, 105.1, 106, 124, 182, 181; 224/281, 277,
278, 42.45 R, 42.44, 42.43; 248/103, 107

[56] References Cited
U.S. PATENT DOCUMENTS

| | | | |
|---|---|---|---|
| 2,601,571 | 6/1952 | Sverkerson | 211/74 |
| 2,633,278 | 3/1953 | Muniz | 280/33.992 |
| 2,946,458 | 7/1960 | Du Boff et al. | 211/94.5 |
| 3,912,291 | 10/1975 | Frisch | 280/33.992 |
| 4,685,701 | 8/1987 | Amundson | 224/277 |
| 4,826,058 | 5/1989 | Nakayama | 224/42.44 |
| 4,938,492 | 7/1990 | Lamarchand et al. | 280/33.992 |
| 5,228,611 | 7/1993 | Yabuya | 224/42.44 |

FOREIGN PATENT DOCUMENTS 4032868  4/1991  Germany ........................ 280/33.992
0645542  9/1962  Italy ................................... 211/94.5

OTHER PUBLICATIONS 14 (plastic-covered) colored photographs of shopping carts.

Primary Examiner—Karin L. Tyson
Assistant Examiner—Ann Marie Boehler
Attorney, Agent, or Firm—Dressler, Goldsmith, Shore & Milnamow, Ltd.

[57] ABSTRACT

In a shopping cart comprising a main basket and a transverse handle mounted behind the main basket, two bars are mounted fixedly to the handle so as to extend forwardly from the handle. Also, a cupholder formed of wire is mounted slidably to the bars so as to permit the cupholder to slide forwardly to a storage position and backwardly to a usage position within a limited range of movement of the cupholder relative to the bars. In the usage position, the cupholder is capable of holding a large cup and a small cup. Each of the bars is wrapped around the handle and has a lower portion, to which one of the end portions of the cupholder is mounted slidably, and an upper portion, on which a coupon tray formed of wire is mounted fixedly.

3 Claims, 1 Drawing Sheet

SHOPPING CART HAVING RETRACTABLE CUPHOLDER

TECHNICAL FIELD OF THE INVENTION

This invention pertains to a shopping cart having a cupholder and more particularly, to a shopping cart having a slidable or retractable cupholder and optionally a coupon tray mounted to the handle thereof.

BACKGROUND OF THE INVENTION

A shopping cart of the type in widespread use has a wire or plastic basket which is mounted on a wheeled chassis and which has a handle mounted on the rear thereof. Commonly, such a cart has a child or infant seat located at the rear of the basket, just forward of the handle. When not in use as a seat for a child or infant, the child seat is often used to store grocery items or to hold beverage containers such as cups and the like. However, because its main function is to provide a seat for a child, the child seat has no device or apparatus to securely hold a cup or container. As a result, the cup or container may tip over, spilling its contents.

Recently, stores such as supermarkets and the like have been catering to their customers by creating a more comfortable shopping atmosphere. This, in turn, has prompted shopping cart manufacturers to design carts having features which focus on shopper comfort and convenience. One such feature is a cupholder for securely holding cups and other beverage containers. However, incorporating such design features must be done while keeping in perspective the direct and indirect cost impact of such features. One such indirect cost impact is that cupholders which extend beyond the confines of the carts may increase the storage space required for the carts when they are not in use.

More recently, shopping carts have been manufactured which have fixedly mounted beverage container holders mounted to a support fixture located between the rear wall of the basket adjacent the child seat and the handle. However, the location of the holder is fixed to the cart in close proximity to the child seat and can, in certain cart designs, interfere with nesting of the shopping carts.

SUMMARY OF THE INVENTION

In accordance with the present invention, a shopping cart is disclosed which has a main basket having a rear wall and horizontal support wire extending along the rear wall, a handle transversely mounted behind the basket, at least one bar mounted fixedly to the handle, and a cupholder mounted to the bar to permit the cupholder to slide forwardly to a storage position and rearwardly to a usage position within a limited range of movement relative to the bar for holding at least one cup therein.

In a preferred embodiment, a coupon tray is mounted to the bar. Preferably, two bars are mounted to the handle and extend forwardly therefrom, and the cupholder is slidably mounted to the bars.

In one embodiment of the invention, the cupholder has two end portions, each end being slidably mounted to one of the bars to permit the cupholder to slide forwardly and rearwardly within a limited range of movement. In this embodiment, it is also preferred that a coupon tray be mounted to at least one of the bars.

It is presently contemplated that the cupholder is formed of wire and has a relatively large loop for holding a relatively large cup having a frusto-conical wall and a relatively small loop for holding a relatively small cup having a frusto-conical wall.

It is also presently contemplated that the bars are wrapped or bent around the handle, each bar forming a lower portion on which the cupholder is slidably mounted and an upper flange portion on which the coupon tray is fixedly mounted.

In a preferred embodiment, the cupholder has two end portions which have upper and lower guide members formed from elongated wire loops fixedly mounted thereto, the upper guide member extends outwardly above the bars and the lower guide member extends outwardly below the bars, the guide members define a slide channel at each end of the cupholder to permit the cupholder to slide forwardly to a storage position and backwardly to a usage position.

These and other objects, features, and advantages of this invention are evident from the following description of the preferred embodiment of this invention with reference to the accompanying drawings.

BRIEF DESCRIPTION OF THE DRAWINGS

FIG. 2 shows, in solid lines, the cupholder in the extended or usage position and, in dashed lines, the cupholder in the retracted or storage position. FIG. 2 also shows the cart nested with a similar cart, the handle of which is shown in dashed lines and which is shown without the cupholder and coupon tray for clarity of illustration.

DETAILED DESCRIPTION OF THE PREFERRED EMBODIMENT

Figure 1:
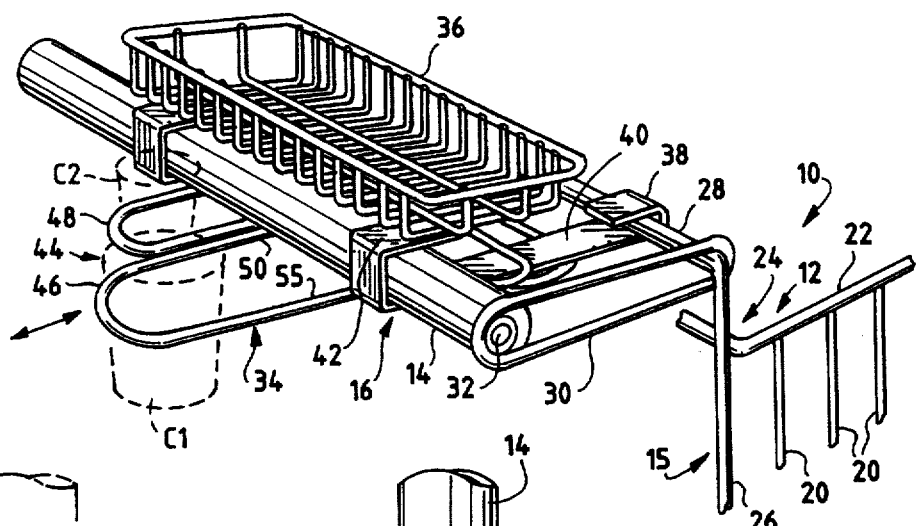
FIG. 1 is a fragmentary perspective view of the rear portion of a wire basket shopping cart showing the handle of the cart and a cupholder and coupon tray mounted thereto, according to the present invention.

As shown generally in FIG. 1, there is shown a shopping cart 10 having a main basket 12, a handle 14 mounted behind the main basket 12, and a cupholder assembly 16 mounted to the handle 14. Typically, the main basket 12 is mounted to a wheeled chassis or undercarriage (not shown). In one form of a typical shopping cart, the handle 14 is mounted to the basket 12 rearward of the rear wall 15. Other embodiments (not shown) may have the handle mounted to an upstanding portion of the chassis or undercarriage.

The main basket 12 is fabricated from relatively light gauge wires 20 which are bent to form the sides and bottom of the basket. Relatively heavier gauge wire 22 is bent in a manner to form the front and sides of the basket and encircle the lighter gauge wires 20. The wires 20, 22 are welded together in a known manner to form the basket 12.

In one embodiment, the cart 10 includes a support wire 24 having upwardly extending portions 26 which extend along each side of the rear of the cart and rise to a level just above the top of the main basket 12, and a horizontal portion 28 which extends between the upwardly extending portions 26 across the back of the cart 10. Two handle mounts 30 extend from the support wire 24 at about the juncture of the horizontal portion 28 and the upwardly extending portions 26. The handle 14 is mounted transverse to the cart 10 between the mounts 30 and extends rearward therefrom. Bolts 32 or other appropriate fasteners fasten the handle 14 to the handle mounts 30.

Figure 3:
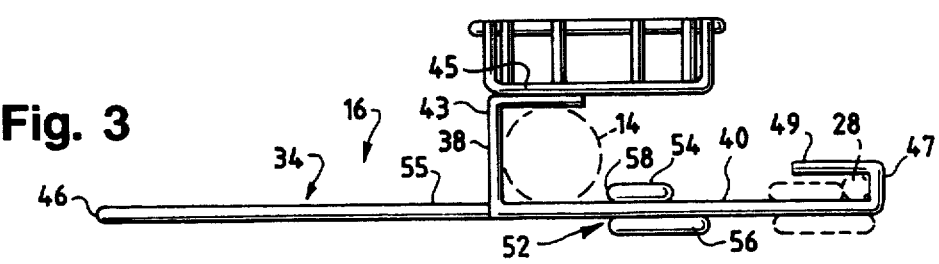
FIG. 3 is a side elevational view similar to FIG. 2 without the nested cart.

The shopping cart 10 includes a cupholder assembly 16. The assembly 16 comprises a cupholder 34, two mounting bars 38, and optionally a coupon tray 36. The mounting bars 38 extend forwardly from the bottom of the handle 14 to the bottom of the horizontal portion 28 of the support wire 24. As best seen in FIGS. 1 and 3, the bars 38 have first ends 43 which are secured to the handle 14 by snugly wrapping or bending the ends 43 around the handle 14 in an upward orientation, then in a forward orientation to form a first flange 45. Similarly, the bars 38 have second ends 47 which are secured to the horizontal portion 28 of the support wire 24 by snugly wrapping or bending the ends 47 around the horizontal portion 28 first in an upward orientation, then in a forward orientation to form a second flange 49. The bars 38, as mounted between the handle 14 and the horizontal portion 28, have a lower portion 40.

In a preferred embodiment, the cupholder 34 is formed of bent, welded wire. The central portion 44 of the wire comprises a first, relatively large loop 46 for holding a relatively large cup C1 having a frusto-conical wall, and a second, relatively small loop 48 for holding a relatively small cup C2 having a frusto-conical wall. The innermost portions of the large and small loops 46, 48, are joined together by means such as welding, as shown at 50, to provide additional rigidity to the cupholder 34. The cupholder 34 is positioned below the handle 14 and between the bars 38.

Figure 2:
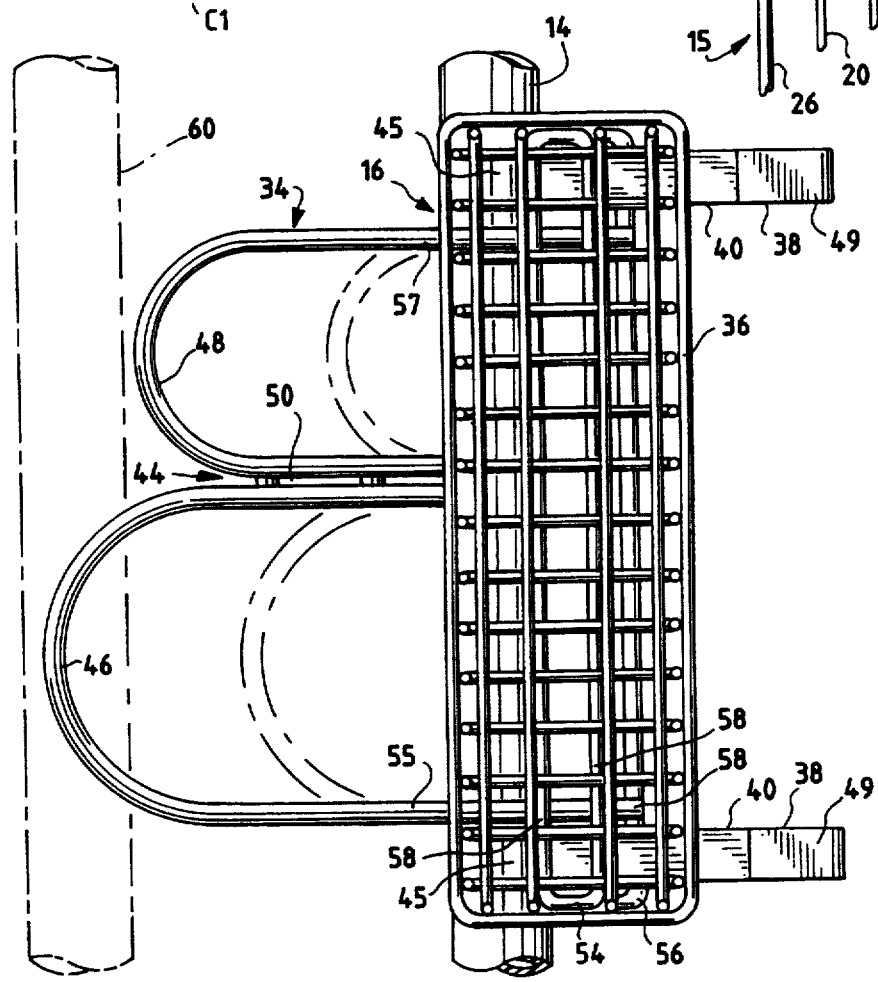
FIG. 2 is a top plan view of a shopping cart having a cupholder and coupon tray.

As best seen in FIGS. 2 and 3, upper and lower guide members 54, 56, are formed from elongated wire loops which are mounted to the end of the cupholder 34. As best seen in FIG. 3, the width of the lower guide member 56 is greater than the width of the upper guide member 54. The upper guide member 54 is fixedly mounted to the upper surface of the cupholder 34 and extends outwardly therefrom, beyond the sidewires 55, 57. Similarly, the lower guide member 56 is fixedly mounted to the lower surface of the cupholder 34 and extends outwardly therefrom, beyond the sidewires 55, 57. In a preferred construction, the upper and lower guide members 54, 56, are mounted to the cupholder 34 by welding or other appropriate means.

The guide members 54, 56, are fixedly mounted to the cupholder 34, parallel to the handle 14, such that the portions of the guide members 54, 56, closest to the handle 14 are in substantially the same vertical plane relative to the handle 14, as indicated at 58 in FIG. 3. The configuration of the upper and lower guide members 54, 56, and the cupholder 34 defines a slide channel 52 around each of the bars 38. The tolerance of fit of slide channel 52 to bars 38 is sufficiently narrow to permit a cantilever effect between the slide channel 52 and the bars 38. This cantilever effect maintains the cupholder 34 in an upright position when the cupholder 34 is in use. However, each channel 52 is formed with sufficient clearance around bars 38 to permit the cupholder 34 to freely slide along the bars 38 between a backward, extended or usage position in which it is shown in solid lines in FIGS. 2 and 3, and a forward, retracted or storage position in which it is shown in dashed lines in FIGS. 2 and 3. In the usage position, the cupholder 34 is sufficiently extended from the handle 14 such that the large loop 46 can hold a relatively large, frusto-conically shaped cup C1, such as a styrofoam coffee cup or the like, and such that the small loop 48 can hold a similar, relatively small, frusto-conical cup C2.

The range of movement of the cupholder 34 between the usage and storage positions is limited, as shown in FIG. 3, by contact between the slide channel 52 and the handle 14 in the usage position, and by contact between the slide channel 52 and the horizontal portion 28 in the storage position. Cupholder 34 is limited in movement in the lateral direction by contact between the sidewires 55, 57, and the bars 38. This configuration permits the cupholder 34 a minor amount of lateral movement, however, it prevents such movement that would allow either slide channel 52 to fully disengage its respective bar 38.

In the usage position, the cupholder 34 extends about three to about four inches rearward from the handle 14 and provides sufficient space to conveniently place a cup into either of the loops 46, 48, or to remove cups therefrom. In the storage position, the cupholder 34 extends minimally, if at all, in a rearward direction beyond the handle 14. The retractability of the cupholder 34 permits the cart 10 to be nested or stored with similar carts, without adversely impacting on the overall storage or floor space required for storing the carts. Given that supermarkets and other mass merchandising stores often have hundreds of such carts, the additional floor space required for carts having fixedly mounted cupholders which extend rearwardly beyond the handles may increase cart storage space requirements by many linear feet.

As best seen in FIG. 2, wherein the cart 10 is shown nested with a similar cart, the handle 60 of which is shown in dashed lines, the cupholder 34 retracts such that it does not interfere with the nesting of the carts.

In a preferred embodiment, the cupholder assembly 16 includes a coupon tray 36, as best seen in FIG. 1. The coupon tray 36 is formed of bent wire which forms the bottom and sides of the tray. Bent wire is also used to form the top edge of the tray 36. The tray 36 is fastened to the first flange 45 by welding or other appropriate means. It is contemplated that the tray 36 can be used to hold coupons or the like, such that they are readily accessible to the shopper.

Preferably, the cupholder assembly 16 and coupon tray 36 are fabricated from steel wire or other suitable ferrous materials. However, it is recognized that many shopping carts are fabricated from plastic or other non-ferrous materials. These materials may also be used to fabricate the entire cupholder assembly 16 and coupon tray 36, or parts thereof, for cost savings or ease of fabrication and installation.

From the foregoing it will be observed that numerous modifications can be effected without departing from the true spirit and scope of the novel concepts of the present invention. It will be understood that no limitation with respect to the specific embodiment illustrated herein is intended or should be inferred. It is, of course, intended to cover by the appended claims all such modifications as fall within the scope of the claims.

What is claimed is:

1. A shopping cart comprising a main basket, a transverse handle mounted behind the main basket, two bars mounted fixedly to the handle so as to extend forwardly from the handle, and a cupholder having two end portions and having upper and lower guide members fixedly mounted thereto, the upper guide member extending laterally above the bars and the lower guide member extending laterally below the bars and guide members defining a slide channel at each of the end portions of the cupholder to permit the cupholder to slide forwardly to a storage position and backwardly to a usage position within a limited range of movement of the cupholder relative to the bars, the cupholder being capable of holding at least one cup when in the usage position, wherein each of the bars is wrapped around the handle and has a lower portion, to which at least one of the slide channels is mounted slidably, and an upper portion, on which a coupon tray is mounted fixedly.

2. The shopping cart of claim 1 wherein the cupholder is formed from wire so as to have a relatively large loop for holding a relatively large cup having a frusto-conical wall and a relatively small loop for holding a relatively small cup having a frusto-conical wall.

3. A shopping cart comprising a main basket having a rear wall and having a substantially horizontal support wire extending along the rear wall, a transverse handle mounted behind the main basket, two bars mounted fixedly at first ends to the handle so as to extend forwardly therefrom and mounted at second ends to the horizontal support wire, each of the first ends extending upwardly and forwardly to wrap around the handle and form a first flange thereabove, each of the second ends extending upwardly and rearwardly to wrap around the horizontal support wire and form a second flange thereabove, the first end extending upwardly a distance greater than the second end, a coupon tray formed of wire mounted fixedly to the flanges, and a cupholder disposed between the bars and mounted slidably thereto, the cupholder having two end portions having upper and lower guide members fixedly mounted thereto, the upper guide member extending above the bars parallel to the handle and being formed from an elongated wire loop, the lower guide member extending below the bars parallel to the handle and being formed from an elongated wire loop having a width greater than the upper guide member, the guide members being positioned substantially vertically coplanar relative to the handle and defining a slide channel at each of the ends of the cupholder so as to permit the cupholder to slide forwardly to a storage position and backwardly to a usage position within a limited range of movement of the cupholder relative to the bars, the cupholder being formed from bent wire so as to have a relatively large loop for holding a relatively large cup having a frusto-conical wall and a relatively small loop for holding a relatively small cup having a frusto-conical wall.

* * * * *

UNITED STATES PATENT AND TRADEMARK OFFICE
CERTIFICATE OF CORRECTION

PATENT NO. : 5,362,077

DATED : November 8, 1994

INVENTOR(S) : Mark Adamson

It is certified that error appears in the above-indentified patent and that said Letters Patent is hereby corrected as shown below:

Column 4, last line, "and" should be --, the--.

Signed and Sealed this

Fourteenth Day of March, 1995

*Attest:*

BRUCE LEHMAN

*Attesting Officer*  *Commissioner of Patents and Trademarks*